(12) United States Patent
Kawamura et al.

(10) Patent No.: US 12,132,336 B2
(45) Date of Patent: Oct. 29, 2024

(54) REGION ENERGY MANAGEMENT DEVICE AND REGION ENERGY MANAGEMENT METHOD

(71) Applicant: Hitachi, Ltd., Tokyo (JP)

(72) Inventors: Tsutomu Kawamura, Tokyo (JP); Ryousuke Nakamura, Tokyo (JP); Tetsushi Ono, Tokyo (JP); Masatoshi Kumagai, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 459 days.

(21) Appl. No.: 17/762,189

(22) PCT Filed: Jul. 22, 2020

(86) PCT No.: PCT/JP2020/028463
§ 371 (c)(1),
(2) Date: Mar. 21, 2022

(87) PCT Pub. No.: WO2021/059719
PCT Pub. Date: Apr. 1, 2021

(65) Prior Publication Data
US 2022/0376522 A1    Nov. 24, 2022

(30) Foreign Application Priority Data
Sep. 25, 2019   (JP) .................................. 2019-174684

(51) Int. Cl.
| | |
|---|---|
| *G05B 19/042* | (2006.01) |
| *B60L 53/66* | (2019.01) |
| *B60L 58/12* | (2019.01) |
| *H02J 7/00* | (2006.01) |

(52) U.S. Cl.
CPC ............ *H02J 7/0032* (2013.01); *B60L 53/66* (2019.02); *B60L 58/12* (2019.02); *G05B 19/042* (2013.01); *H02J 7/0048* (2020.01); *H02J 7/0063* (2013.01); *H02J 7/0068* (2013.01); *G05B 2219/2639* (2013.01)

(58) Field of Classification Search
CPC ...... H02J 7/0032; H02J 7/0048; H02J 7/0063; H02J 7/0068; B60L 53/66; B60L 58/12; G05B 19/042; G05B 2219/2639
See application file for complete search history.

(56) References Cited

U.S. PATENT DOCUMENTS

| | | | |
|---|---|---|---|
| 2012/0249068 A1 | 10/2012 | Ishida | |
| 2013/0079937 A1* | 3/2013 | Aisu | ...................... H02J 3/003 700/286 |

FOREIGN PATENT DOCUMENTS

| | | |
|---|---|---|
| JP | 2010-088147 A | 4/2010 |
| JP | 2015-073369 A | 4/2015 |
| JP | 2017-103938 A | 6/2017 |
| WO | 2011/077780 A1 | 6/2011 |

* cited by examiner

*Primary Examiner* — Gary Collins
(74) *Attorney, Agent, or Firm* — Volpe Koenig

(57) ABSTRACT

This regional energy management device calculates the power interchange between consumers, on the basis of: storage battery level distribution indicating the relationship between storage battery levels and the position of storage batteries in a region at each time; excess or shortages of power for each consumer at each time, if a consumer has implemented a power supply equipment operation plan for fulfilling a consumer target index for that consumer; and an overall regional target index.

11 Claims, 10 Drawing Sheets

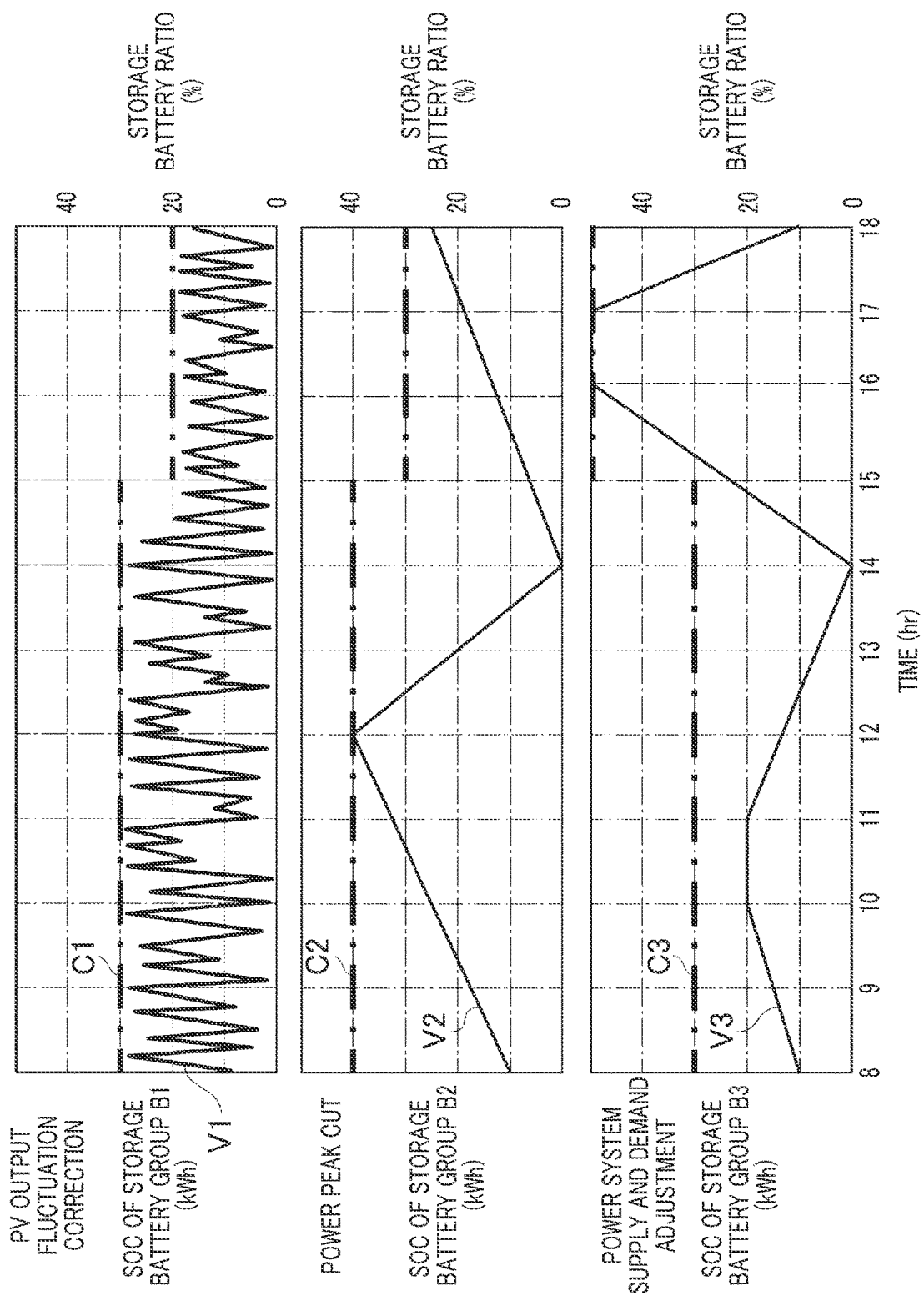

REGION ENERGY MANAGEMENT DEVICE AND REGION ENERGY MANAGEMENT METHOD

TECHNICAL FIELD

The present invention relates to a region energy management device and a region energy management method that manage energy in a region.

BACKGROUND ART

Conventionally, consumers such as a building, a factory, and a home have introduced photovoltaics (PV), a cogeneration system, a storage battery, and the like and perform operation control with energy saving by an energy management system (EMS) for the purpose of reducing energy cost and $CO_2$ emissions. In addition, in recent years, with the increase in the amount of renewable energy introduced, the need for adjustment of supply and demand balance is increasing in a power system, and the need for providing adjustment power by demand response (DR) of consumers is increasing.

On the other hand, in the future, it is predicted that electric vehicles (EV) will become widespread in large numbers, and it is expected that an energy management system saves energy, reduces $CO_2$ emissions, and provides adjustment power by using storage batteries (hereinafter referred to as "EV storage batteries") installed in electric vehicles.

As a technique relating to an energy management device that uses a conventional EV storage battery, Patent Literature 1 discloses an operation method that provides a power supply and demand system that can systematically operate an EV storage battery as a power load and a power supply source in a consumer. The consumer includes an optimization planning unit that makes an optimal operation plan for a power supply source and obtains a target remaining battery level of an EV storage battery at a predicted vehicle warehousing time, and a communication unit that can transmit information regarding the target remaining battery level to an EV. The EV controls the operation of the EV such that the remaining battery level at the predicted vehicle warehousing time becomes the target remaining battery level according to the information regarding the target remaining battery level.

CITATION LIST

Patent Literature

Patent Literature 1: Japanese Unexamined Patent Application Publication NO. 2010-88147

SUMMARY OF INVENTION

Technical Problem

However, although the method disclosed in Patent Literature 1 is used for an EV storage battery to reduce energy cost of a specific consumer, it is not considered to reduce the cost for energy of all multiple consumers through which an electric vehicle goes. In addition, Patent Literature 1 presents energy cost reduction as an indicator to be considered by the consumer, but a plurality of indicators such as $CO_2$ reduction and provision of adjustment power to a power system is not considered.

From the above-described situation, means for managing energy of all multiple consumers through which a mobile body with a storage battery goes so as to satisfy target indicators different for the consumers has been desired.

Solution to Problems

To solve the above problems, according to an aspect of the present invention, a region energy management device is disposed in a region including two or more consumers each including at least power supply equipment connected to a power system or a power load connected to the power system and a charging/discharging device that charges and discharges a storage battery installed in a mobile body, and is connected directly or indirectly to energy management devices of the consumers and an energy management device of the mobile body and able to communicate data with the energy management devices of the consumers and the energy management device of the mobile body. The region energy management device calculates an amount of power to be interchanged between the consumers based on a storage battery remaining level distribution indicating a relationship between a position of the storage battery present in the region at each time and a remaining level of the storage battery at each time, and excessive and deficient power of each of the consumers at each time and a target indicator of the entire region at each time in a case where each of the consumers implements an operation plan for the power supply equipment to satisfy a target indicator of each of the consumers.

Advantageous Effects of Invention

According to at least an aspect of the present invention, it is possible to manage energy of all consumers so as to satisfy target indicators different for the consumers by causing a mobile body with a storage battery to go through the plurality of consumers and performing charging and discharging in each of the consumers.

Problems, configurations, and effects other than those described above will be clarified from the following description of embodiments.

BRIEF DESCRIPTION OF DRAWINGS

FIG. 10 is a diagram illustrating an example in which a plurality of stationary storage batteries of a certain consumer according to the embodiment of the present invention, and EV storage batteries of a plurality of electric vehicles parked at the consumer are collectively operated.

DESCRIPTION OF EMBODIMENTS

Hereinafter, an example of a mode (hereinafter referred to as "embodiment") for carrying out the present invention is described with reference to the accompanying drawings. In the present specification and the accompanying drawings, components that have substantially the same functions or configurations are indicated by the same reference signs and duplicate descriptions are omitted.

First Embodiment

[Energy System for Consumers]

First, an example of a configuration of an energy system including a plurality of consumers present in a region to which a region energy management device according to an embodiment of the present invention is applied is described. The present embodiment provides an energy system that causes power supply equipment owned by each of the consumers in the region and a storage battery installed in a mobile body such as a vehicle to coordinate with each other so as to manage energy for the entire region.

Figure 1:
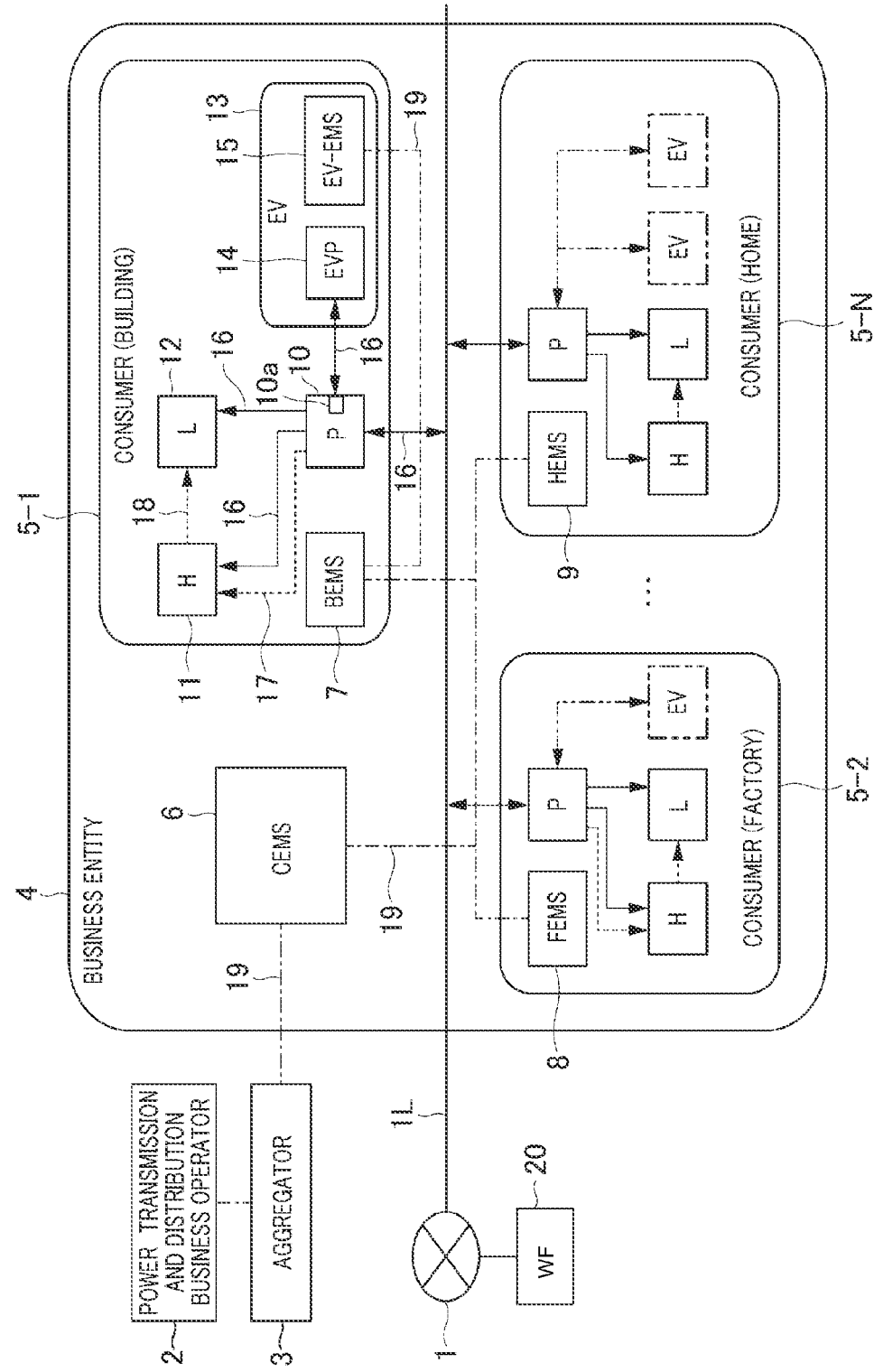
FIG. 1 is a block diagram illustrating an example of a configuration of an energy system including a plurality of consumers present in a region to which a region energy management device according to an embodiment of the present invention is applied.

FIG. 1 is a block diagram illustrating an example of a configuration of the energy system including the plurality of consumers present in the region to which the region energy management device according to the embodiment is applied. In FIG. 1, a region energy management device (CEMS: Community EMS) 6 is applied to a business entity 4 including a plurality of consumers 5-1 to 5-N (N is an integer of 2 or greater), each of which is constituted by a building, a factory, a home, or the like.

In FIG. 1, the business entity 4 includes the plurality of consumers 5-1 to 5-N and the region energy management device ("CEMS" in the drawing) 6. The consumer 5-1 is a commercial building and includes, for example, power supply equipment ("P" in the drawing) 10, heat source equipment ("H" in the drawing) 11, load equipment ("L" in the drawing) 12, and a commercial building energy management device (BEMS: Building EMS) 7. The consumer 5-2 is a factory and includes, for example, power supply equipment (P) 10, heat source equipment (H) 11, load equipment (L) 12, and a factory energy management device (FEMS: Factory EMS) 8. The consumer 5-N is a home and includes, for example, power supply equipment (P) 10, heat source equipment (H) 11, load equipment (L) 12, and a home energy management device (HEMS: Home EMS) 9. In the present specification, each of energy management devices other than the region energy management device 6 is abbreviated as "EMS" in some cases.

The power supply equipment 10 is equipment that may serve as a power supply of electric energy. For example, the power supply equipment 10 is a power generator of a cogeneration system, a storage battery, or photovoltaics (PV). In the present embodiment, a storage battery installed in an electric vehicle (EV) 13 present at a consumer 5 is treated as one type of the power supply equipment 10 operated by each of the consumers 5. The electric vehicle 13 is an example of a mobile body provided with a storage battery. As the mobile body, various vehicles such as a hybrid vehicle and a flying object can be applied. The mobile body to which the present embodiment is applied may be able to move using power of the installed storage battery as a power source.

The heat source equipment 11 is, for example, a refrigerator of the cogeneration system, a heat pump, a boiler, or the like for each of the building and the factory. In addition, the heat source equipment 11 is, for example, a heat pump for the home.

The load equipment 12 is, for example, air conditioning equipment or a lighting device or is production equipment for the factory. The heat source equipment 11 and the load equipment 12 are examples of a power load.

The electric vehicle 13 arrives at each of the consumers 5-1 to 5-N based on a traveling plan and is parked (present) for a predetermined period of time. The electric vehicle is hereinafter referred to as "EV" in some cases. The electric vehicle 13 includes a storage battery ("EVP" in the drawing) 14 and an energy management device (EV-EMS) 15 that controls and manages operations such as charging and discharging of the storage battery 14. The storage battery 14 is an example of a mobile body side storage battery. In the present specification, the storage battery 14 is also referred to as "EV storage battery 14".

In the example illustrated in FIG. 1, one electric vehicle (EV) 13 is parked at the consumer 5-1. In addition, broken lines indicate that, at another time point, one electric vehicle (EV) 13 is present at the consumer 5-2 and two electric vehicles (EVs) 13 are present at the consumer 5-N.

The power supply equipment 10 of each of the consumers 5-1 to 5-N includes a charging/discharging device 10a that has a terminal to be electrically connected to the EV storage battery 14 of the electric vehicle 13 and charges and discharges the EV storage battery 14. The charging/discharging device 10a is hereinafter referred to as "EV charging/discharging device 10a". The EV charging/discharging device 10a is an example of a charging/discharging device that charges and discharges the mobile body side storage battery. The EV storage battery 14 is charged or discharged via the EV charging/discharging device 10a of the power supply equipment 10 included in a destination consumer.

Various energy management devices (BEMS7, FEMS8, HEMS9) of the consumers 5-1 to 5-N make an operation plan for the equipment such as the power supply equipment 10, the heat source equipment 11, and the load equipment 12 and controls the equipment such as the power supply equipment 10, the heat source equipment 11, and the load equipment 12. The power supply equipment 10 of each of the consumers 5-1 to 5-N is connected to a power transmission and distribution line 1L of a power system 1. The power system 1 is connected to various power generation systems such as a wind power generation system (WF) 20 and another business entity (not illustrated).

The region energy management device (CEMS) 6 coordinates with the energy management devices (BEMS7, FEMS8, HEMS9) of the consumers 5-1 to 5-N to manage energy of the entire business entity 4 via a communication network 19. The region energy management device 6 is connected to an aggregator 3 via the communication network 19. The aggregator 3 is connected to a power transmission and distribution business operator 2 via the communication network 19. The aggregator 3 requests a large number of business entities and consumers to provide adjustment power and aggregates the obtained adjustment power. The example illustrated in FIG. 1 indicates that the one business entity 4 among the large number of business entities and the consumers is connected to the aggregator 3. When the consumers 5-1 to 5-N are not distinguished, each of the consumers 5-1 to 5-N is referred to as "consumer 5".

The region energy management device 6 receives various information from the energy management devices (BEMS7, FEMS8, HEMS9, EV-EMS15) of the consumers 5 included in the business entity 4, transmits an instruction to each of the energy management devices, and manages energy of the entire region, that is, energy of each of the consumers 5 such that a target KPI (Key Performance Indicator) of the entire region (in the business entity 4) is satisfied. Examples of the KPI are the following indicators. Normally, the target KPI is set as any one of the KPIs.

(1) Operation cost (unit: yen)
(2) $CO_2$ emissions (unit: $kg\_CO_2$)
(3) Primary energy (power energy to be purchased, gas energy to be purchased) (unit: MJ)

The aforementioned "yen" is an example of operation cost. "$kg\_CO_2$" is $CO_2$ emissions (kg). The $CO_2$ emissions indicate an environmental load. The primary energy is energy (power and fuel energy) necessary to meet a demand.

When the request for the adjustment power is given from the aggregator 3, the region energy management device 6 makes a plan (adjustment power to be allocated to each of the consumers, an amount of power to be interchanged between the consumers) that satisfies the target KPI of the entire region on the assumption that this adjustment power is procured. The region energy management device 6 allocates the adjustment power requested from the aggregator 3 to each of the consumers 5 (including the EV storage battery 14 of the present electric vehicle 13) included in the business entity 4.

The adjustment power requested from the aggregator 3 is a constraint (constraint to be met) on the energy management of the business entity 4 by the region energy management device 6. However, when the region energy management device 6 is unlikely to be able to procure the requested adjustment power, the region energy management device 6 notifies the aggregator 3 that the "procurement is not possible" or of a "procurable amount".

The adjustment power in this case is the capacity of power generation equipment, a power storage device, or demand response (DR) necessary for the power transmission and distribution business operator 2 to provide an ancillary service in a supply region, another system that controls power supply and demand, or others equivalent thereto.

A power transmission and distribution network of the power transmission and distribution business operator 2 has functions (frequency control, supply and demand balance adjustment, and other system stabilization (flow adjustment, voltage adjustment, and the like)). The ancillary service according to the present embodiment is an operation service that causes the power system 1 and power generation equipment of each of the consumers connected to the power system 1 to coordinate with each other to maintain the power quality. For the adjustment power, not only a case where the power transmission and distribution business operator 2 controls power supply and demand but also a case where a retail electric power business entity that operates the wind power generation system (WF) 20 or the like controls power supply and demand are included.

The power supply equipment 10 of each of the consumers 5-1 to 5-N supplies power 16 to the heat source equipment 11 and the load equipment 12. The power generator of the cogeneration system as the power supply equipment 10 installed in the building, the factory, and the like can supply exhaust heat 17 to an exhaust heat utilization type absorption refrigerator of the cogeneration system as the heat source equipment 11. The heat source equipment 11 can supply thermal energy 18 of cold water, warm water, or steam to the load equipment 12. When power is insufficient with only the power supply equipment 10, the energy management devices 7 to 9 can provide a request to purchase power to a power company (power generation business operator).

When surplus power is generated or power is insufficient in each of the consumers 5-1 to 5-N, the region energy management device 6 causes power to be interchanged between the consumers 5-1 to 5-N to optimize energy supply and demand in the business entity 4.

When it is necessary to adjust supply and demand balance in the power system 1, the power transmission and distribution business operator 2 requests the aggregator 3 to provide adjustment power, and the aggregator 3 requests the business entity 4 to provide adjustment power. The region energy management device 6 of the business entity 4 makes an operation plan for generating the adjustment power in coordination with the energy management devices 7 to 9 of the consumers 5-1 to 5-N in response to the request for the adjustment power from the aggregator 3.

On the other hand, in response to the request for the adjustment power from the region energy management device 6, each of the energy management devices 7, 8, and 9 makes an operation plan satisfying a target KPI set for each of the energy management devices on the assumption that this adjustment power is procured. For example, each of the energy management devices 7, 8, and 9 procures the adjustment power by demand response or the like of the various equipment included in the consumers 5. In the present embodiment, as one type of the power supply equipment 10, the storage battery 14 of the electric vehicle (EV) 13 is used. The EV storage battery 14 can supply power via the EV charging/discharging device 10a of the power supply equipment 10 by discharging to power systems in the consumers 5, and can be charged from the power systems.

[Functional Configuration of Each Energy Management Device]

Next, a functional configuration of each energy management device is described.

Figure 2:
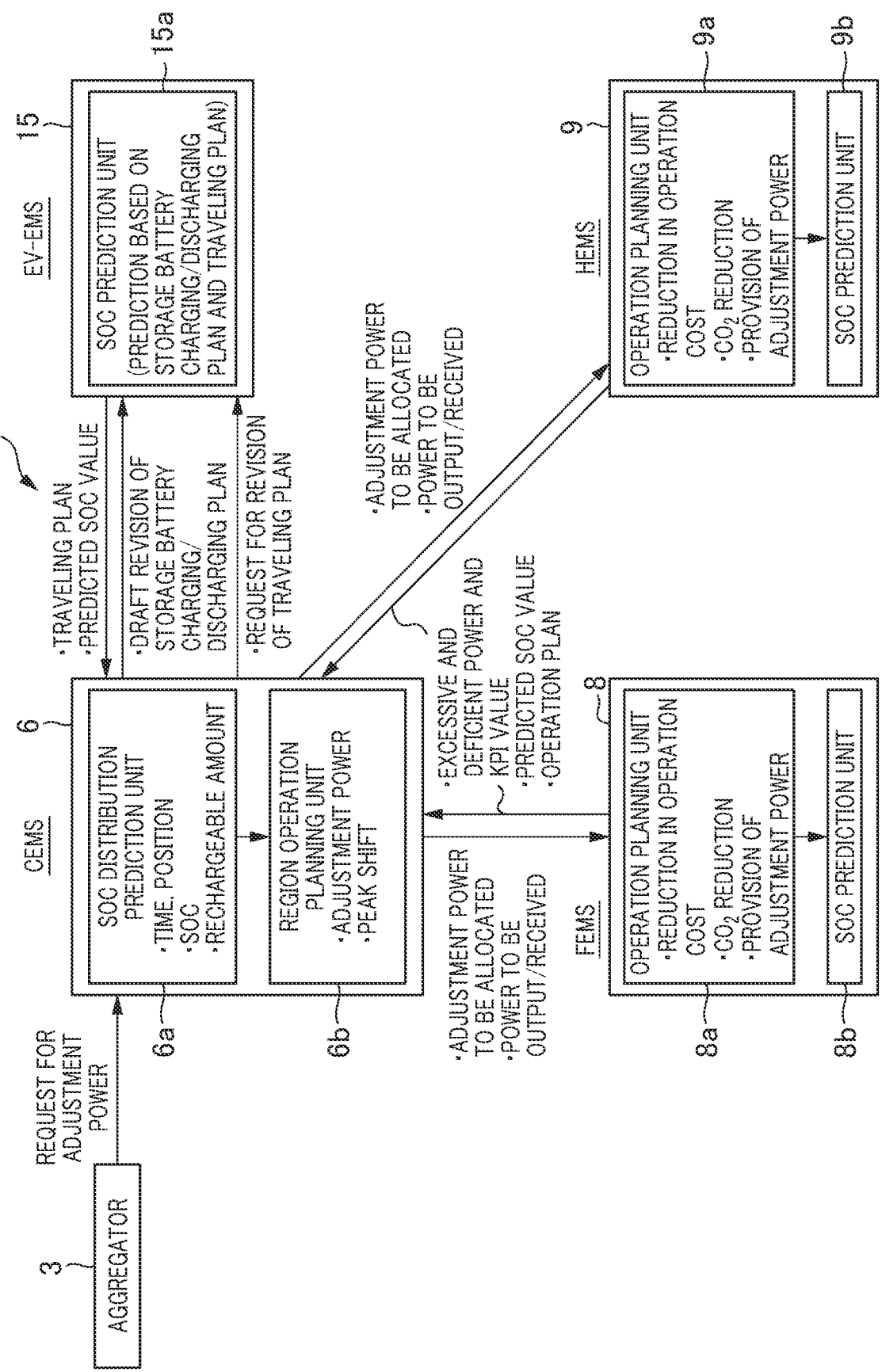
FIG. 2 is a block diagram illustrating an example of a functional configuration of each of energy management devices (CEMS, FEMS, HEMS, and EV-EMS) according to the embodiment of the present invention.

FIG. 2 is a block diagram illustrating an example of a functional configuration of each of the energy management devices (CEMS6, FEMS8, HEMS9, EV-EMS15). Although FIG. 2 does not illustrate the energy management device 7 (BEMS), the energy management device 7 has the same functions as those of the energy management devices 8 and 9.

(Region Energy Management Device)

The region energy management device (CEMS) 6 includes an SOC distribution prediction unit 6a and a region operation planning unit 6b. The SOC distribution prediction unit 6a (an example of a remaining level distribution prediction unit) receives the following information from each of the consumers 5 and predicts a distribution of an SOC (State of charge) of the entire region at each time in the future (for example, 24 hours). The SOC distribution is information indicating the position of the storage battery at each time and a state (remaining level) of the storage battery at each time. In this case, as the SOC distribution of the entire region, an SOC distribution (including information of a stationary storage battery and an EV storage battery) of each of the consumers and an SOC distribution of the EV storage battery 14 of each electric vehicle 13 are predicted. The stationary storage battery is a storage battery included in each of the consumers 5.

Information from each of the energy management devices (FEMS8, HEMS9):
(1) A predicted value of an SOC (amount of charge and available capacity) (kWh) of the stationary storage battery at each time
(2) A predicted value of an SOC (amount of charge and available capacity) (kWh) of the EV storage battery 14 of each EV 13 present at the corresponding consumer at each time.
(3) A predicted value of a rechargeable and dischargeable amount (kWh) at each time.

The chargeable and rechargeable amount at each time that is described in (3) is total power with which the storage battery can be charged and discharged in one consumer 5 at a certain time. For example, when the electric vehicle 13 is present at a target time, the "chargeable and rechargeable amount" is a chargeable and rechargeable amount in the case where the stationary storage battery and the EV storage battery 14 are treated as one storage battery. In addition, when the target consumer 5 does not include a stationary storage battery, the "chargeable and rechargeable amount" is a chargeable and rechargeable amount of only the EV storage battery 14.

Information from the EV energy management device (EV-EMS15):
A traveling plan
A predicted SOC value The traveling plan is information of the destination (consumer 5 or the like) of the electric vehicle 13, an arrival time at the destination, a parking time, a movement time, and the like. The predicted SOC value of the EV-EMS15 is described later.

The region operation planning unit 6b receives the target KPI and the following information from each of the consumers 5 and performs power supply and demand matching (adjustment) at each time. The region operation planning unit 6b calculates "adjustment power (adjustment power to be allocated)" to each of the consumers 5 at each time and an "amount (power to be output and received by each of the consumers) of power to be interchanged between the consumers" and instructs (requests) each of the consumers 5. The power to be output and received by each of the consumers is hereinafter referred to as "power to be output/received". In addition, the region operation planning unit 6b makes a "charging/discharging plan (draft revision) for an EV rechargeable battery" of each electric vehicle 13 for the business entity 4 and transmits the plan to each electric vehicle 13. For the "charging/discharging plan (draft revision) for the EV rechargeable battery", only a difference from the previous "charging/discharging plan for the EV rechargeable battery" may be calculated. Furthermore, to change an SOC for each of the consumers 5, the region operation planning unit 6b instructs (requests) a change in a traveling plan for each electric vehicle 13 as needed.

Information from each of the energy management devices (FEMS8, HEMS9):
(1) Deficient power or requested power (kW) and a predicted value of the intensity (yen/kWh, kg_$CO_2$/kWh, MJ/kWh) of a KPI therefor at each time
(2) Surplus power or power (kW) that can be provided and a predicted value of the intensity (yen/kWh, kg_$CO_2$/kWh, MJ/kWh) of a KPI therefor at each time
(3) An operation plan for the power supply equipment 10

The power described in the above-described (1) and (2) is collectively referred to as "excessive and deficient power". For example, when the power generator of the power supply equipment 10 operates with 80% of rated power, 20% of the rated power is power that can be provided. In addition, in a storage battery charged with 40% of the maximum capacity at a certain time, when the charged amount (remaining charged amount) is not used at the time, 40% of the maximum capacity is surplus power. In the present embodiment, power can be interchanged between the consumers over time by using the EV storage battery 14 of the electric vehicle 13 (mobile body). Therefore, when a fee for power purchased from a power company varies depending on time, information of surplus power or power that can be provided and the aforementioned chargeable and rechargeable amount is reflected in the calculation of a time when power is interchanged.

(Energy Management Devices of Consumers)

The factory energy management device (FEMS) 8 includes an operation planning unit 8a and an SOC prediction unit 8b. Similarly, the home energy management device (HEMS) 9 includes an operation planning unit 9a and an SOC prediction unit 9b. The operation planning unit 8a and the operation planning unit 9a have the same functions, while the SOC prediction unit 8b and the SOC prediction unit 9b have the same functions.

The operation planning units 8a and 9a make an operation plan for various types of equipment based on "adjustment power (adjustment power to be allocated)" received from the region energy management device 6 and an "amount of power to be interchanged between the consumers (power to be output/received by each of the consumers)" in order to achieve the target KPI of each of the consumers 5. This operation plan includes an operation plan for the stationary storage battery that is one type of the power supply equipment 10 and an operation plan for the EV storage battery 14.

In addition, to improve the KPIs, the SOC prediction units 8b and 9b predict excess and deficiency of power and an SOC of each storage battery and retransmits the following to the region energy management device 6.

Information to be provided to the region energy management device 6.
(1) Deficient power or requested power and a predicted value of the intensity (yen/kWh, kg_$CO_2$/kWh, MJ/kWh) of a KPI therefor at each time
(2) Surplus power or power (kW) that can be provided and a predicted value of the intensity (yen/kWh, kg_$CO_2$/kWh, MJ/kWh) of a KPI therefor at each time
(3) A predicted value of an SOC (amount of charge and available capacity) (kWh) of the stationary storage battery at each time
(4) A predicted value of an SOC (amount of charge and available amount) (kWh) of the EV storage battery 14 of each EV 13 present at the corresponding consumer at each time
(5) A predicted value of a chargeable and rechargeable amount (kWh) at each time
(6) An operation plan for the power supply equipment 10

(Energy Management Device of Mobile Body)

The EV energy management device (EV-EMS) 15 includes an SOC prediction unit 15a.

The SOC prediction unit 15a receives the "charging/discharging plan (draft revision) for the EV storage battery" that has been calculated by the region energy management device 6 directly or via the energy management device of the consumer 5 at which the electric vehicle is present. Then, the energy management device 15 predicts an SOC for the EV storage battery 14 based on this charging/discharging plan (draft revision) and the traveling plan and retransmits the result of predicting the SOC and the traveling plan to the region energy management device 6 directly or via the energy management device of the consumer 5 at which the electric vehicle is present.

In the following description, when an "XX unit" is described as a main operation unit, it means that a CPU 31 reads a program of a YY unit from a ROM 32 or nonvolatile storage 36 and loads the program into a RAM 33 to enable a function of the YY unit.

[Hardware Configuration of Computing Device Included in Each Energy Management Device]

Figure 3:
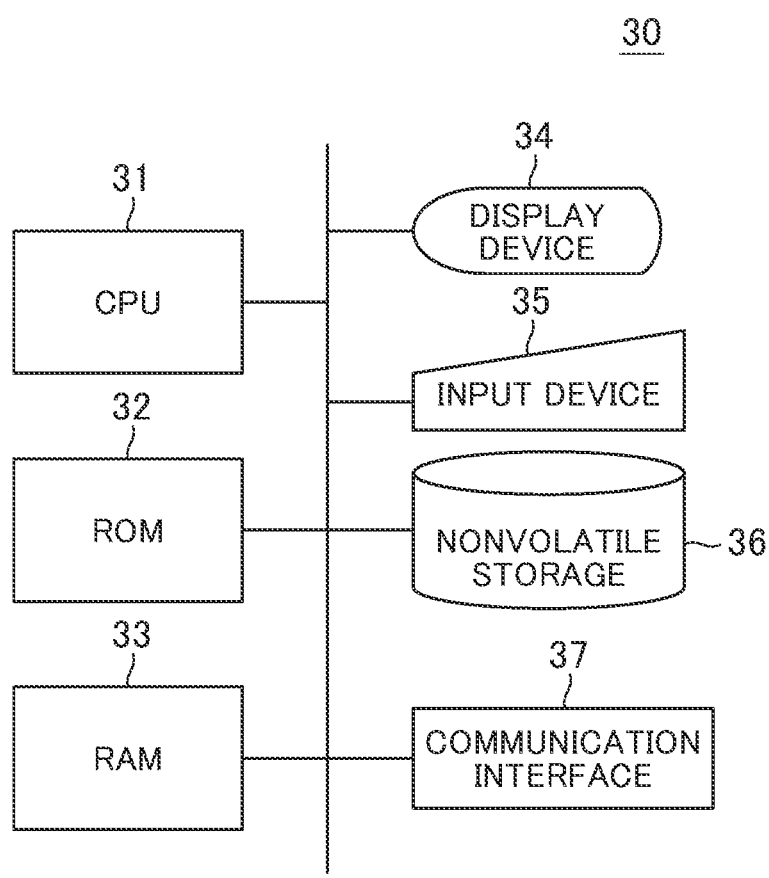
FIG. 3 is a block diagram illustrating an example of a hardware configuration of the region energy management device according to the embodiment of the present invention, and a hardware configuration of a computing device included in each of the energy management devices.

FIG. 3 is a block diagram illustrating an example of a hardware configuration of a computing device 30 included in each of the region energy management device 6 and the energy management devices 7 to 9 and 15.

The computing device 30 is hardware used as a so-called computer. The computing device 30 includes a CPU (central processing unit) 31, a ROM (read only memory) 32, and a RAM (random access memory) 33 that are connected to a bus. The computing device 30 further includes a display device 34, an input device 35, nonvolatile storage 36, and a communication interface 37.

The CPU 31 reads, from the ROM 32, a program code of software for enabling each function according to the present embodiment, loads the program code into the RAM 33, and executes the program code. A variable, a parameter, and the like that are generated in the middle of arithmetic processing by the CPU 31 are temporarily written to the RAM 33 and read by the CPU 31 as needed. Although the CPU 31 is used as an arithmetic processing device, another processor such as an MPU (micro processing unit) may be used.

The display device 34 is, for example, a liquid crystal display monitor and displays a result of processing executed by the computing device 30 and the like to a user. A touch panel, a push button switch, or the like is used as the input device 35. The user can perform a predetermined input operation and an instruction on the input device 35. The display device 34 and/or the input device 35 may not be provided depending on the energy management device.

As the nonvolatile storage 36, for example, an HDD (hard disk drive), an SSD (solid state drive), a flexible disk, an optical disc, a magneto-optical disc, a CD-ROM, a CD-R, a magnetic tape, a nonvolatile memory, or the like is used. In the nonvolatile storage 36, an OS (operating system), various parameters, and a program and data that are used to cause the computing device 30 to function are recorded. For example, the traveling plan and the operation plan for each type of the equipment may be recorded in the nonvolatile storage 36. The ROM 32 and the nonvolatile storage 36 permanently records a program, data, and the like necessary for the CPU 31 to operate.

As the communication interface 37, for example, an NIC (network interface card), a modem, or the like is used. The communication interface 37 is configured to transmit and receive various data to and from an external device via a LAN connected to a terminal, the communication network 19 such as the Internet, a dedicated line, or the like

[Process by Region Energy Management Device (CEMS)]

Figure 4:
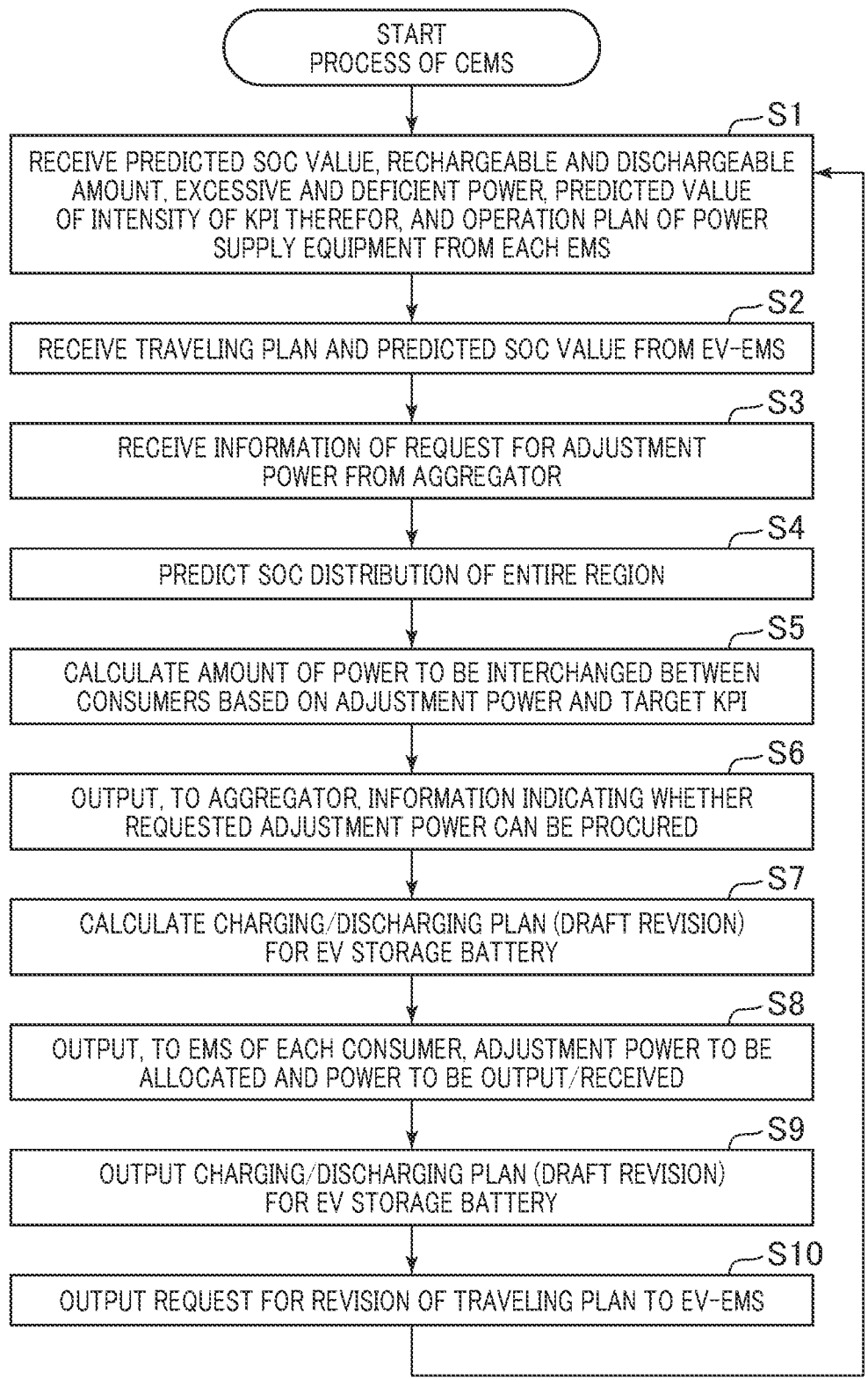
FIG. 4 is a flowchart illustrating an example of a process by the region energy management device (CEMS) according to the embodiment of the present invention.

FIG. 4 is a flowchart illustrating an example of a process by the region energy management device (CEMS) 6.

First, the CPU 31 (FIG. 3) of the region energy management device 6 (CEMS) uses the communication interface 37 to receive, from the energy management device (EMS) of each of the consumers 5, a predicted SOC value of each of the stationary battery device and the EV storage battery 14 of the parked electric vehicle 13 at each time and the rechargeable and dischargeable amount at each time. In addition, the CPU 31 of the region energy management device 6 receives, from the energy management device (EMS) of each of the consumers 5, excessive and deficient power at each time, a predicted value of the intensity of a KPI therefor at each time, and an operation plan for the power supply equipment 10. For example, when each of the consumers 5 includes a power generator and a storage battery (stationary and EV storage batteries) as the power supply equipment 10, the CPU 31 of the region energy management device 6 acquires an operation plan for each of the power generator and the storage battery (S1).

Next, the CPU 31 of the region energy management device 6 uses the communication interface 37 to receive the traveling plan and a predicted SOC value of the EV storage battery 14 from the EV energy management device 15 (EV-EMS) installed in the electric vehicle 13 (S2).

Next, the CPU 31 of the region energy management device 6 uses the communication interface 37 to receive information of a request for adjustment power from the aggregator 3 (S3).

Next, the SOC distribution prediction unit 6a of the region energy management device 6 predicts an SOC distribution of the entire region at each time in the future (for example, 24 hours) based on the predicted SOC values of the stationary storage battery and the EV storage battery 14 at each time and the rechargeable and dischargeable amount at each time (S4). That is, the SOC distribution prediction unit 6a predicts an SOC distribution (including information of the stationary storage battery and the EV storage battery) of each consumer 5 and an SOC distribution of the EV storage battery 14 of each electric vehicle 13.

Next, the region operation planning unit 6b of the region energy management device 6 performs power supply and demand matching (adjustment) at each time based on the requested adjustment power and the target KPI of the business entity 4 and calculates adjustment power to be allocated to each of the consumers 5 and an amount (power to be output/received by each of the consumers) of power to be interchanged between the consumers 5 (S5). In this case, in the power supply and demand matching (adjustment), for example, optimization calculation is performed for the purpose of minimizing a total value of KPIs of all the consumers for 24 hours. However, when KPIs different for the consumers are used, the optimization calculation is performed for each of the KPIs, and results of performing the power supply and demand matching (adjustment) on the KPIs are summed.

In this case, the region operation planning unit 6b provides, to the aggregator 3, a response indicating whether the requested adjustment power can be procured (S6). When the adjustment power cannot be procured, the region operation planning unit 6b provides a response indicating that the "procurement is not possible" or indicating a "procurable amount". When the adjustment power can be procured, the response to the aggregator may be omitted.

Next, the region operation planning unit 6b calculates a charging/discharging plan (draft revision) for each EV storage battery 14 from the SOC distribution of the EV storage battery 14 of each electric vehicles 13 and the amount (power to be output/received by each of the consumers) of power to be interchanged between the consumers 5 (S7). Normally, a charging/discharging plan for the EV storage battery 14 of each electric vehicle 13 is prepared for the start of the operation of the energy system according to the present embodiment. Therefore, it can be said that the calculation of the charging/discharging plan for the EV storage battery 14 is the calculation of a draft revision of the charging/discharging plan.

Next, the CPU 31 of the region energy management device 6 uses the communication interface 37 to output information of the adjustment power to be allocated and the power to be output/received to the energy management devices (EMS) of the consumers 5 (S8).

Next, the CPU 31 of the region energy management device 6 uses the communication interface 37 to output the charging/discharging plan (draft revision) of the EV storage battery 14 to the EV energy management device 15 of each electric vehicle 13 directly or via the energy management devices (EMSs) of the consumers 5 (S9). The "charging/discharging plan for the EV storage battery" is updated by the region energy management device 6 as needed. In addition, since the charging/discharging plan needs to be changed due to a change in the traveling plan for the electric vehicle 13 or a change (change in a decrease rate of a remaining battery level of the EV storage battery 14) in the state of the EV storage battery 14, the "charging/discharging plan for the EV storage battery" is updated by the EV energy management device 15 as needed.

Next, the CPU 31 of the region energy management device 6 uses the communication interface 37 to output a request to revise the traveling plan to the EV energy management device 15 of the electric vehicle 13 parked at the consumer 5 (S10). For example, examples of the revision of the traveling plan are a change in a period of time when the electric vehicle 13 is present at each consumer 5, a change in an arrival time when the electric vehicle arrives at a consumer 5 next, a change in a movement route of the electric vehicle 13, and the like.

After step S10 is ended, the process returns to step S1. The processes of steps S1 to S10 are repeated at a predetermined time interval (for example, a time interval of 10 minutes). By setting the repeating time interval to a shorter time, the accuracy of the energy management by the region energy management device 6 can be improved. When it is not necessary to revise the traveling plan, step S10 can be omitted.

[Process by Energy Management Devices (EMSs) of Consumers]

Figure 5:
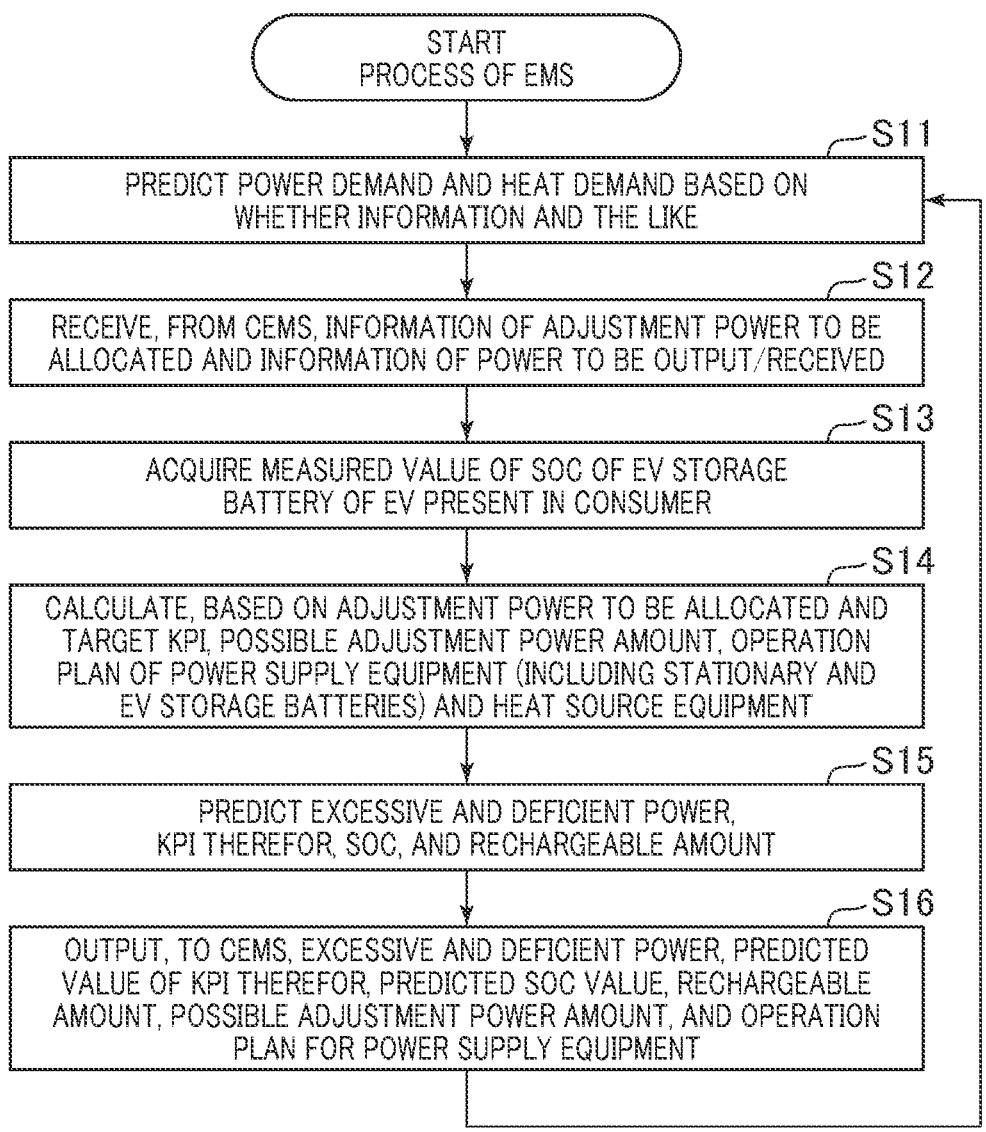
FIG. 5 is a flowchart illustrating an example of a process by energy management devices (EMSs) of consumers according to the embodiment of the present invention.

FIG. 5 is a flowchart illustrating an example of a process by the energy management devices 8 and 9 (EMSs) of the consumers 5-2 and 5-N.

First, the CPUs 31 (FIG. 3) of the energy management devices 8 and 9 of the consumers 5-2 and 5-N predict demand for power and demand for heat in the consumers 5 based on weather information and event information received by the communication interfaces 37 via the communication network 19 (S11). Each of the energy management devices 8 and 9 performs the process of step S11 at a predetermined time interval (for example, a time interval of 30 minutes).

Next, the CPUs 31 of the energy management devices 8 and 9 receive, from the region energy management device 6 (CEMS), information of adjustment power to be allocated to each of the consumers 5 and power to be output/received (S12).

Next, the CPUs 31 of the energy management devices 8 and 9 acquire a value measured by a measuring device (not illustrated) and indicating the SOC of the EV storage battery 14 of the electric vehicle 13 present (parked) at the consumer 5 (S13). Therefore, each of the energy management devices of the consumers 5 can perform various types of calculation based on a measured (latest information) value of the SOC of the EV storage battery 13 and manage energy with high accuracy.

Next, the operation planning units 8a and 9a of the energy management devices 8 and 9 calculate a possible adjustment power amount and operation plans for the power supply equipment 10 (including the stationary storage battery and the EV storage battery 14) based on the adjustment power to be allocated and the target KPI for each of the consumers 5 (S14). In this case, for the operation plan for each of the consumers 5, optimization calculation is performed for the purpose of minimizing the total value of the KPIs of the consumers for 24 hours, for example.

Next, the operation planning units 8a and 9a predict excessive and deficient power and a KPI therefor and the SOC prediction units 8b and 9b predict the SOC and the rechargeable and dischargeable amount (S15).

Next, the CPUs 31 of the energy management devices 8 and 9 use the communication interfaces 37 to output the excessive and deficient power, the predicted value of the intensity of the KPI therefor, the predicted SOC value, the rechargeable and dischargeable amount, and the operation plan for the power supply equipment 10 to the region energy management device 6 (S16).

After the end of step S16, the process returns to step S11 and the processes of steps S11 to S16 are repeated at a predetermined time interval (for example, a time interval of 10 minutes). By setting the repeating time interval of step S11 and the repeating time interval steps S12 to S16 to shorter times, the accuracy of the energy management by the energy management devices and 8 and 9 can be improved.

[Process by EV Energy Management Device (EV-EMS)]

Figure 6:
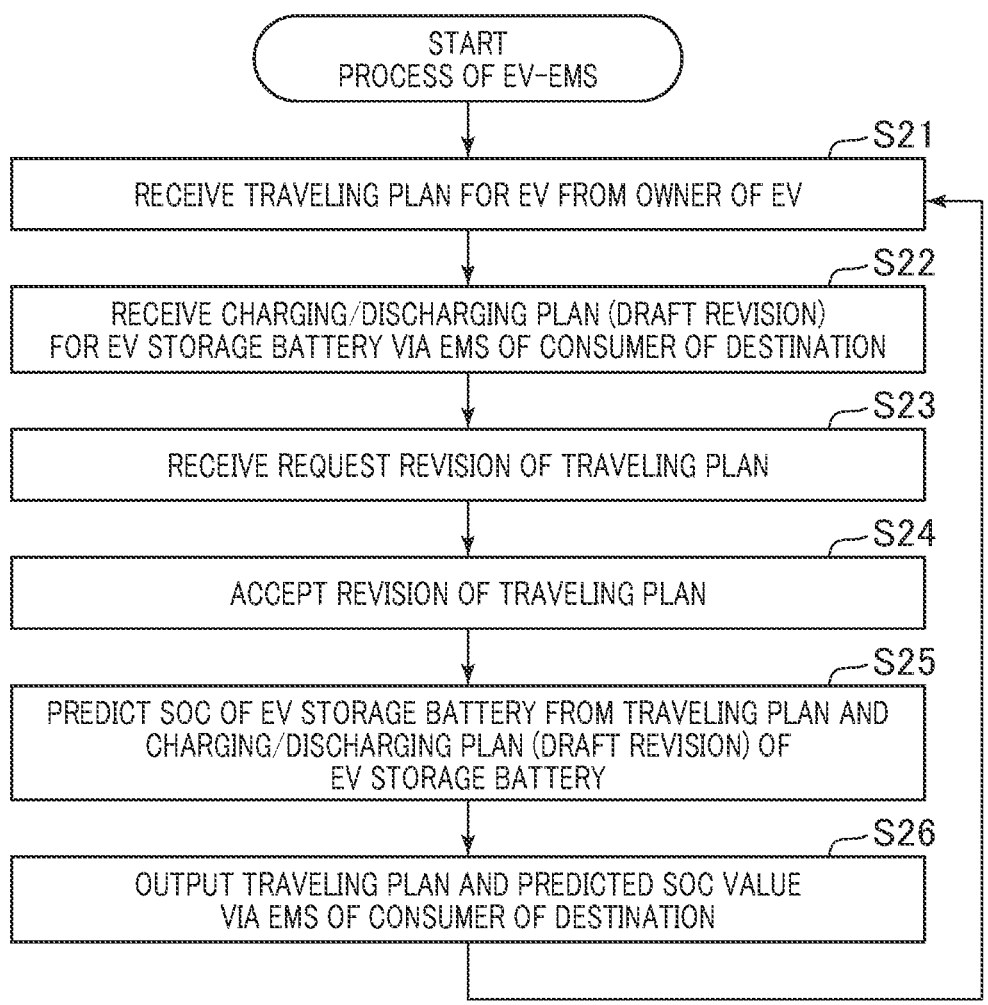
FIG. 6 is a flowchart illustrating an example of a process by the EV energy management device (EV-EMS) according to the embodiment of the present invention.

FIG. 6 is a flowchart illustrating an example of a process by the EV energy management device 15 (EV-EMS).

First, the CPU 31 (FIG. 3) of the EV energy management device 15 (EV-EMS) receives input of the traveling plan for the electric vehicle 13 from an owner of the electric vehicle 13 (S21).

Next, the CPU 31 of the EV energy management device 15 receives a charging/discharging plan (draft revision) for the EV storage battery 14 that has been calculated by the energy management device (EMS) of the consumer 5 at which the electric vehicle is present. Alternatively, the CPU 31 of the EV energy management device 15 receives a charging/discharging plan (draft revision) for the EV storage battery 14 that has been calculated by the region energy management device 6 (CEMS) directly or via the energy management device (EMS) of the consumer 5 at which the electric vehicle is present (S22).

Next, the CPU 31 of the EV energy management device 15 receives a request to revise the traveling plan for the electric vehicle 13 from the energy management device (EMS) of the consumer 5 at which the electric vehicle is present. In addition, the CPU 31 of the EV energy management device 15 receives a request to revise the traveling plan for the electric vehicle 13 from the region energy management device 6 directly or via the energy management device (EMS) of the consumer 5 at which the electric vehicle is present (S23). When it is not necessary to revise the traveling plan, the processes of steps S22 and S23 are omitted.

Next, the CPU 31 of the EV energy management device 15 displays, based on the request to revise the traveling plan from the region energy management device 6 (CEMS), a traveling plan revision screen on the display device 34 and instructs a user to revise the traveling plan. Then, the CPU 31 of the EV energy management device 15 receives the revision of the traveling plan input by the user using the input device 35 and causes the revised traveling plan to be stored in the nonvolatile storage 36 (S24).

Next, the SOC prediction unit 15a of the EV energy management device 15 predicts the SOC of the EV storage battery 14 from the traveling plan and the charging/discharging plan (draft revision) for the EV storage battery 14 (S25).

Next, the EV energy management device 15 outputs the traveling plan and the predicted SOC value to the energy management device (EMS) of the consumer 5 at which the electric vehicle or to the region energy management device 6 directly or via the energy management device (EMS) of the consumer 5 at which the electric vehicle is present (S26).

After the end of step S26, the process returns to step S21 and the processes of steps S21 to S26 are repeated at a predetermined time interval (for example, a time interval of 10 minutes). By setting the repeating time interval of steps S21 to S26 to a shorter time, the accuracy of the energy management by the EV energy management device 15 can be improved.

[Coordination of Region Energy Management Device and Each Energy Management Device]

Figure 7:
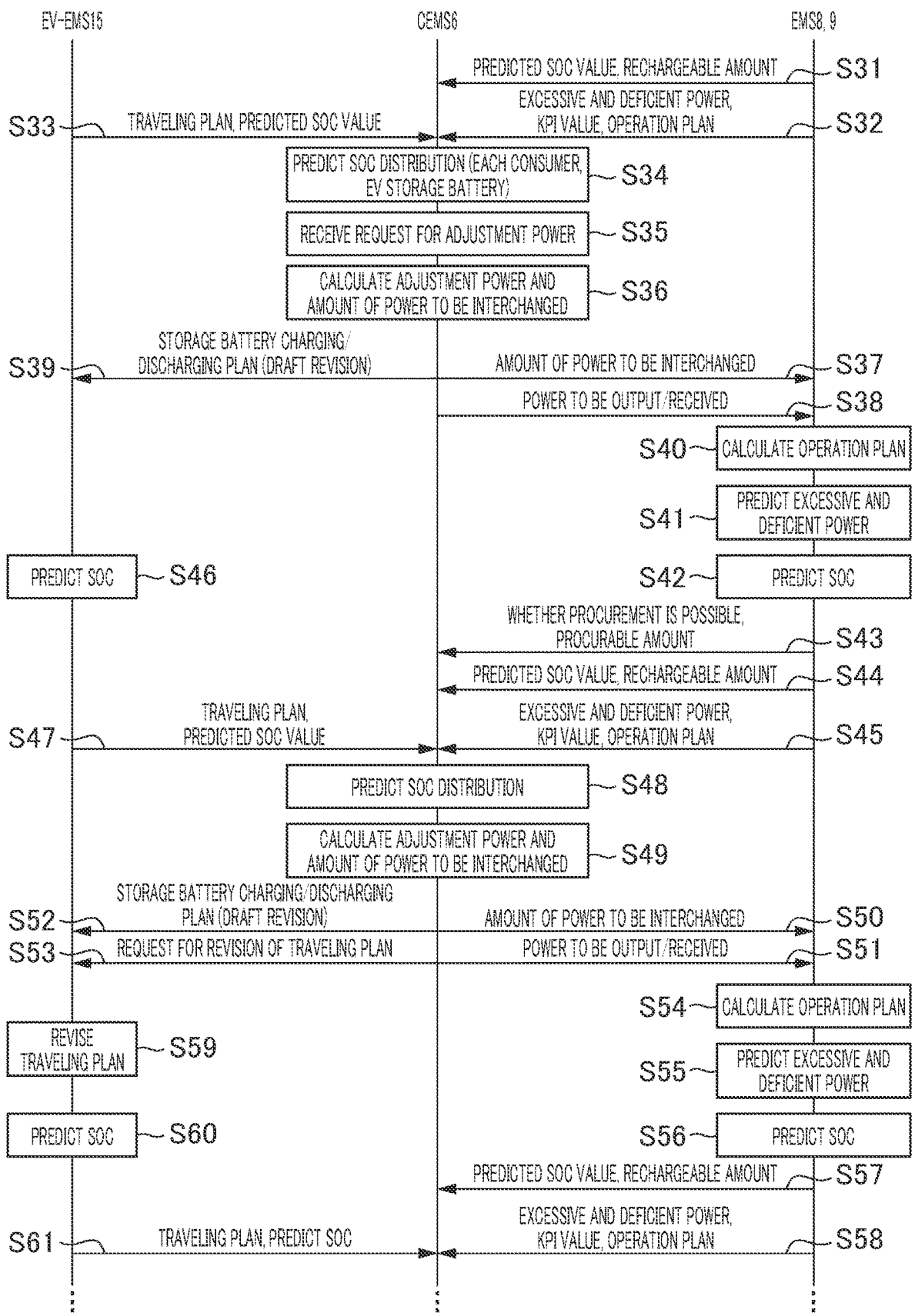
FIG. 7 is a sequence diagram illustrating an example of coordination of the region energy management device (CEMS) according to the embodiment of the present invention, the EV energy management device (EV-EMS), and the energy management devices (EMSs) of the consumers.

FIG. 7 is a sequence diagram illustrating an example of coordination of the region energy management device 6 (CEMS), the EV energy management device 15 (EV-EMS), and the energy management devices 8 and 9 (EMSs) of the consumers 5-2 and 5-N. In this example, like FIG. 2, the energy management device 7 (BEMS) is not described but the same processes as those in the energy management devices 8 and 9 are performed in the energy management device 7.

First, the CPU 31 of the region energy management device 6 (CEMS) uses the communication interface 37 to receive a predicted SOC value and a predicted value of the rechargeable and dischargeable amount from each of the energy management devices 8 and 9 (EMSs) of the consumers 5-2 and 5-N (S31). In addition, the CPU 31 of the region energy management device 6 receives excessive and deficient power, a predicted value of the intensity of a KPI therefor, and the operation plan for the power supply equipment 10 from the energy management devices 8 and 9 of the consumers 5-2 and 5-N (S32). Furthermore, the CPU 31 of the region energy management device 6 receives the traveling plan and the predicted SOC value from the EV energy management device 15 (EV-EMS) of the electric vehicle 13 (S33).

Next, the SOC distribution prediction unit 6a of the region energy management device 6 (CEMS) predicts an SOC distribution of each of the consumers 5 and an SOC distribution of the EV storage battery 14 of each electric vehicle 13 (S34).

Next, the CPU 31 of the region energy management device 6 (CEMS) receives a request for adjustment power from the aggregator 3 (S35). It is sufficient if the request for adjustment power is received before step S36.

Next, the region operation planning unit 6b of the region energy management device 6 (CEMS) calculates adjustment power to be allocated to each of the consumers 5 and an amount (power to be output/received by each of the consumers 5) of power to be interchanged between the consumers 5 (S36).

Next, the CPU 31 of the region energy management device 6 (CEMS) transmits information of the adjustment power to be allocated to each of the consumers 5 and the power to be output/received to each of the energy management devices 8 and 9 (EMSs) (S37, S38). In addition, the CPU 31 of the region energy management device 6 transmits the charging/discharging plan (draft revision) for the EV storage battery 14 of each electric vehicle 13 to the EV energy management device 15 (EV-EMS) of each electric vehicle 13 directly or via the energy management device 8 or 9 at which the electric vehicle is present (S39).

Next, the operation planning units 8a and 9a of the energy management devices 8 and 9 make operation plans for the power supply equipment 10 and the heat source equipment 11 of the consumers 5-2 and 5-N (S40). Next, the operation planning units 8a and 9a predict excessive and deficient power of the consumers 5-2 and 5-N and the intensity of a KPI therefor (S41). Next, each of the SOC prediction units 8b and 9b of the energy management devices 8 and 9 predicts the SOC of each of the stationary storage batteries of the consumers 5-2 and 5-N and the EV storage battery 14 and the rechargeable and dischargeable amount (S42).

Next, the CPUs 31 of the energy management devices 8 and 9 transmit, to the region energy management device 6 (CEMS), information indicating whether adjustment power to be allocated can be procured or a procurable amount when the procurement is not possible (S43).

Next, each of the CPUs 31 of the energy management devices 8 and 9 uses the communication interface 37 to transmit the predicted SOC value and the rechargeable and dischargeable amount to the region energy management device 6 (CEMS) (S44). In addition, each of the CPUs 31 of the energy management devices 8 and 9 transmits excessive and deficient power, the predicted value of the intensity of the KPI therefor, and the operation plan for the power supply equipment 10 to the region energy management device 6 (S45).

On the other hand, the SOC prediction unit 15a of the EV energy management device 15 predicts the SOC of the EV storage battery 14 from the traveling plan and the charging/discharging plan (draft revision) for the EV storage battery 14 that has been calculated by the region energy management device 6 (S46). Next, the CPU 31 of the EV energy management device 15 transmits the traveling plan and the predicted SOC value to the region energy management device 6 (CEMS) directly or via the energy management device 8 or 9 at which the electric vehicle is present (S47).

Next, the SOC distribution prediction unit 6a of the region energy management device 6 (CEMS) predicts an SOC distribution of each of the consumers 5 and an SOC distribution of the EV storage battery 14 of each electric vehicle 13 again in the same manner as step S34 (S48). In addition, the region operation planning unit 6b of the region energy management device 6 recalculates adjustment power to be allocated to each of the consumers 5 and an amount of power to be interchanged between the consumers 5 in the same manner as step S35 (S49).

Next, the CPU 31 of the region energy management device 6 (CEMS) transmits information of the adjustment power to be allocated to each of the consumers 5 and the power to be output/received to the energy management devices 8 and 9 (EMSs) (S50, S51). In addition, the CPU 31 of the region energy management device 6 transmits the charging/discharging plan (draft revision) for the EV storage battery 14 of each electric vehicle 13 to each EV energy management device 15 (EV-EMS) (S52).

In this case, when the region operation planning unit 6b of the region energy management device 6 (CEMS) determines that it is necessary to revise the traveling plan for the electric vehicle 13, the CPU 31 outputs a request to revise the traveling plan to the EV energy management device 15 installed in the corresponding electric vehicle 13 (S53).

Next, each of the operation planning units 8a and 9a of the energy management devices 8 and 9 makes operation plans for the power supply equipment 10 and the heat source equipment 11 in the same manner as step S40 (S54) and predicts excessive and deficient power and the intensity of a KPI therefor again in the same manner as step S41 (S55). Each of the SOC prediction units 8b and 9b of the energy management devices 8 and 9 predicts an SOC of each of the stationary storage battery and the EV storage battery 14 and the rechargeable and dischargeable amount again in the same manner as step S42 (S56).

Next, each of the CPUs 31 of the energy management devices 8 and 9 (EMSs) transmits the predicted SOC value and the rechargeable and dischargeable amount to the region energy management device 6 (CEMS) (S57) and transmits the excessive and deficient power, the predicted value of the intensity of the KPI therefor, and the operation plan for the power supply equipment 10 to the region energy management device 6 (S58).

On the other hand, the CPU 31 of the EV energy management device 15 (EV-EMS) receives the revision of the traveling plan by the user based on the request to revise the traveling plan from the region energy management device 6 (CEMS) (S59).

Next, the SOC prediction unit 15a of the EV energy management device 15 predicts the SOC of the EV storage battery 14 again from the charging/discharging plan (draft revision) for the EV storage battery 14 and the traveling plan after the revision in the same manner as step S46 (S60). Next, the CPU 31 of the EV energy management device 15 transmits the traveling plan and the predicted SOC value to the region energy management device 6 (S61).

Next, the region energy management device 6 (CEMS), the energy management devices 8 and 9 (EMSs) of the consumers 5-2 and 5-N, and the EV energy management device 15 of each electric vehicle 13 repeat the processes of step S34 and the subsequent steps. By repeating the series of processes described above, individual KPIs can be improved in the entire business entity 4, that is, in the business entity and each of the consumers 5.

As described above, the region energy management device according to the present embodiment is installed in a region including two or more consumers each including at least power supply equipment connected to a power system or a power load connected to the power system and a charging/discharging device that charges and discharges a storage battery installed in a mobile body, and is connected directly or indirectly to energy management devices of the consumers and an energy management device of the mobile body and able to communicate data with the energy management devices of the consumers and the energy management device of the mobile body. The region energy management device calculates an amount of power to be interchanged between the consumers based on a storage battery remaining level distribution indicating a relationship between a position of the storage battery present in the region at each time and a remaining level of the storage battery at each time, and excessive and deficient power of each of the consumers at each time and a target indicator of the entire region at each time in a case where each of the consumers implements an operation plan for the power supply equipment to satisfy a target indicator of each of the consumers.

According to the above-described configuration according to the present embodiment, it is possible to implement the system that manages energy of all the consumers 5 (business entity 4) by causing the mobile body (electric vehicle 13) provided with the storage battery 14 to go through the plurality of consumers 5-1 to 5-N and performing charging and discharging in each of the consumers 5.

In addition, according to the present embodiment, in the energy system including the plurality of consumers 5 in the region (business entity 4), it is possible to implement an operation plan for the power supply equipment that satisfies target indicators (KPIs) different for the consumers 5.

In addition, as described above, the region energy management device according to the present embodiment includes a remaining level distribution prediction unit that predicts, as the storage battery remaining level distribution in the region, a consumer storage battery remaining level distribution indicating a relationship between a position of a storage battery of each of the consumers at each time and a remaining level of the storage battery at each time and a mobile body side storage battery remaining level distribution indicating a relationship between a position of the storage battery of the mobile body at each time and a remaining level of the storage battery at each time, and a region operation planning unit that calculates, based on the amount of power to be interchanged between the consumers, power to be output by each of the consumers at each time and power to be received by each of the consumers at each time.

In addition, as described above, in the present embodiment, information indicating a relationship between a position of a stationary storage battery installed as the power supply equipment in each of the consumers at each time and a remaining level of the storage battery at each time, and information indicating a relationship between the storage battery of the mobile body at each time and a remaining level of the storage battery at each time are reflected in the consumer storage battery remaining level distribution.

In addition, as described above, in the present embodiment, the power interchange between the consumers is performed by power interchange via a power transmission and distribution line of the power system connected to the plurality of consumers and/or power interchange using the mobile body provided with the storage battery.

When the storage battery installed in the mobile body is used to interchange power between the consumers, the mobile body needs to be moved to the consumers in accordance with the traveling plan. On the other hand, since the power transmission and distribution line of the power system does not need to be moved, the method using the power transmission and distribution line is more reliable than the method using the storage battery of the mobile body. In addition, power can be interchanged in almost real time by using the power system. Therefore, for example, the power transmission and distribution line of the power system may be used on a priority basis, and the storage battery of the mobile body may be used when the storage battery of the mobile body needs to be used for some reason.

In addition, as described above, when adjustment power is to be procured by the region energy management device from each of the consumers, the region energy management device according to the present embodiment determines a ratio of a storage battery capacity for adjustment power to a total storage battery capacity of a storage battery included in the consumer based on an operation plan for the power supply equipment included in the consumer at which the mobile body is present.

In addition, as described above, in the present embodiment, the energy management device of the mobile body charges and discharges the storage battery installed in the mobile body in accordance with an instruction from the region energy management device or the energy management device of the consumer. The region energy management device or the energy management device of the consumer outputs the instruction for charging and discharging to the energy management device of the mobile body at a time based on the charging/discharging plan (draft revision) for the EV storage battery.

In addition, as described above, in the present embodiment, a remaining storage battery level of the storage battery that is predicted based on the traveling plan and the charging/discharging plan for the storage battery installed in the mobile body is input from the energy management device of the mobile body to the region energy management device.

In addition, as described above, in the present embodiment, deficient power or requested power at each time, a predicted value of the intensity of a KPI therefor at each time, surplus power or power that can be provided at each time, and a predicted value of the intensity of a KPI therefor at each time are input from the energy management device of each of the consumers to the region energy management device.

[Example of Charging/Discharging Plan for EV Storage Battery]

Figure 8:
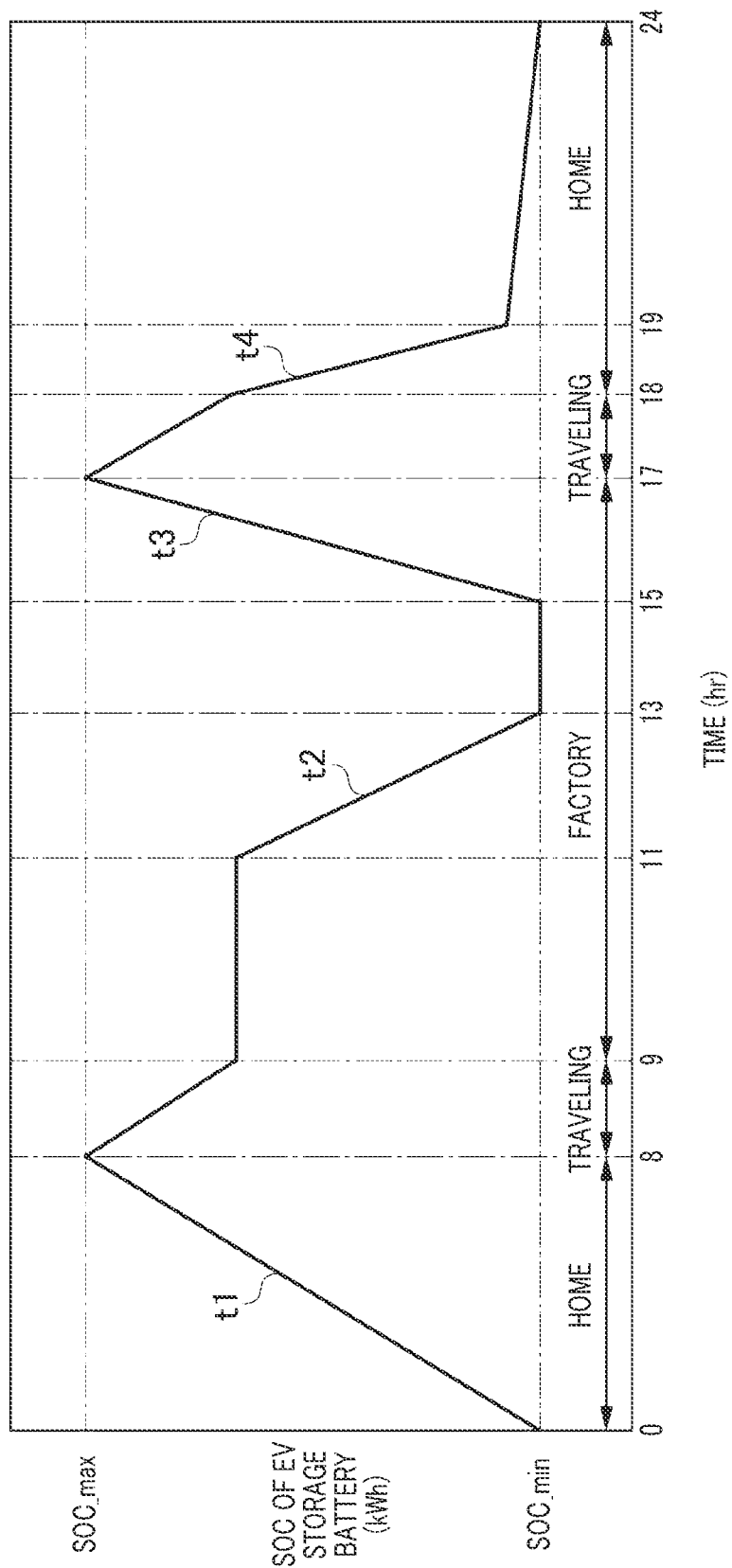
FIG. 8 is a diagram illustrating an example of a charging/discharging plan for an EV storage battery by the region energy management device according to the embodiment of the present invention and the energy management device of the consumer.

FIG. 8 is a diagram illustrating an example of the charging/discharging plan for the EV storage battery 14 by the region energy management device 6 (CEMS) and the energy management device (EMS) of the consumer 5. In FIG. 8, the horizontal axis indicates time (hr) from 0:00 to 24:00 and the vertical axis indicates a planned value (kWh) of a remaining battery level (SOC) of the EV storage battery 14 of the single electric vehicle 13.

As a basic operational form of the EV storage battery 14, the electric vehicle 13 is parked at the home and managed by the home energy management device 9 (HEMS) from 19:00 to 8:00 on the next day, travels from 8:00 to 9:00 for a user to go to work, is parked at the factory and managed by the factory energy management device 8 (FEMS) from 9:00 to 17:00, and travels from 17:00 to 18:00 for the user to go home.

The EV storage battery 14 uses inexpensive power at midnight at the home from 0:00 to 8:00 (time zone t1) and is charged from the lower limit "SOC min" of the SOC to the upper limit "SOC max" of the SOC and discharged for traveling to go to work to the factory from 8:00 to 9:00. In addition, at the factory, the EV storage battery 14 is discharged to the lower limit "SOC min" for demand response from 11:00 to 13:00 (time zone t2) and is charged with surplus power of the PV or the cogeneration system (power supply equipment 10) from 15:00 to 17:00 (time zone t3). Furthermore, the EV storage battery 14 is discharged for traveling to go home from 17:00 to 18:00 and discharged from 18:00 to 19:00 (time zone t4) in accordance with an instruction from the home energy management device 9 (HEMS) in response to a request for adjustment power from the region energy management device 6 (CEMS). From 19:00 to 24:00, the EV storage battery discharges power for the home. In this case, surplus power is generated from the factory energy management device 8 (FEMS) from 15:00 to 17:00 (time zone t3), and the region energy management device 6 (CEMS) makes a plan for interchanging power from the factory to the home using the EV storage battery 14 based on information that requires adjustment power from 18:00 to 19:00 (time zone t4).

[Another Example of Charging/Discharging Plan for EV Storage Battery]

Figure 9:
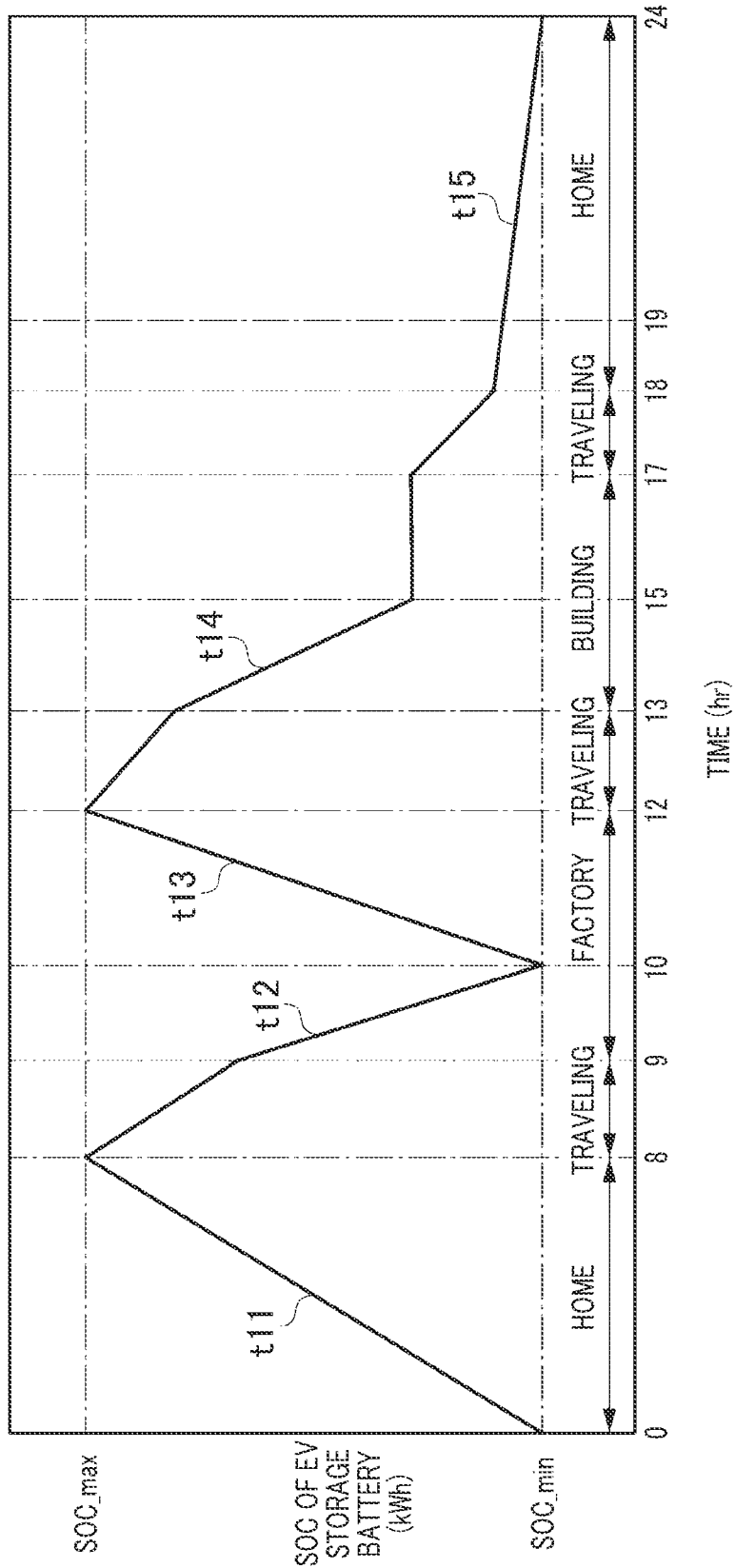
FIG. 9 is a diagram illustrating another example of the charging/discharging plan for the EV storage battery by the region energy management device according to the embodiment of the present invention and the energy management device of the consumer.

FIG. 9 is a diagram illustrating another example of the charging/discharging plan for the EV storage battery 14 by the region energy management device 6 (CEMS) and the energy management device (EMS) of the consumer 5. FIG. 9 illustrates an example of a change in the remaining storage battery level (SOC) of the EV storage battery 14 in the case where the electric vehicle 13 returns to the home after moving from the home through factory to the building. In FIG. 9, the horizontal axis indicates time [hr] from 0:00 to 24:00 and the vertical axis indicates a planned value [kWh] of the remaining storage battery level (SOC) of the EV storage battery 14 of the single electric vehicle 13.

As a basic operational form, the electric vehicle 13 is parked at the home and managed by the home energy management device (HEMS) from 19:00 to 8:00 on the next day, travels from 8:00 to 9:00 for the user to go to work, and is parked at the factory and managed by the factory energy management device 8 (FEMS) from 9:00 to 12:00. After that, the electric vehicle 13 travels from 12:00 to 13:00 to move from the factory to the building, is parked at the building and managed by the building energy management device 7 (BEMS) from 13:00 to 17:00, and travels from 17:00 to 18:00 for the user to go home.

The EV storage battery 14 uses inexpensive power at midnight at the home and is charged from the lower limit "SOC min" of the SOC to the upper limit "SOC max" of the SOC from 0:00 to 8:00 (time zone t11) and is discharged for traveling to the factory for work from 8:00 to 9:00. In addition, the EV storage battery 14 is discharged to the lower limit "SOC min" to supply power for production to the factory from 9:00 to 10:00 (time zone t12) and is charged with surplus power of the PV (power supply equipment 10) from 10:00 to 12:00 (time zone t13). Furthermore, the EV storage battery 14 is discharged to move from the factory to the building from 12:00 to 13:00. After arriving at the building, the EV storage battery 14 is discharged for power peak cut of the building from 13:00 to 15:00 (time zone t14). Then, the EV storage battery 14 is discharged for traveling to go home from 17:00 to 18:00 and discharges power for the home from 18:00 to 24:00 (time zone t15). In this case, surplus power is generated from the factory energy management device 8 (FEMS) from 10:00 to 12:00 (time zone t13), and the region energy management device 6 (CEMS) makes a plan for power interchange by the EV storage battery 14 based on information received from the building energy management 7 (BEMS) and indicating that power is deficient from 13:00 to 15:00 (time zone t14).

[Operation Example of Storage Batteries of Consumers and Storage Battery of EV]

FIG. 10 is a diagram illustrating an example in which a plurality of stationary storage batteries of a certain consumer (for example, a building) and EV storage batteries 14 of a plurality of electric vehicles 13 parked at the consumer are collectively operated. In graphs illustrated in FIG. 10, the horizontal axis indicates time, the left vertical axis indicates an SOC (kWh) of a storage battery group, and the right vertical axis indicates the ratio (%) of the capacity of a target EV storage battery 14 to the total storage battery capacity of the consumer.

In this example, a storage battery group (set of a plurality of storage batteries) for correcting an output fluctuation of photovoltaics (PV) installed at the consumer 5 is B1, a storage battery group for performing power peak cut on the consumer 5 is B2, and a storage battery group for providing adjustment power of the consumer 5 is B3. A part of all storage batteries (total storage battery capacity) is used as the storage battery groups B1 to B3 according to the use. All the storage batteries may be physically divided for each usage purpose.

Dashed-and-dotted lines indicated on the upper to lower graphs in FIG. 10 indicate allocated capacities C1 to C3 of the storage batteries (B1, B2, and B3), and solid lines indicate planned values V1 to V3 (kWh) of SOCs of the storage battery groups. For each consumer 5, any combination of any of the plurality of stationary storage batteries of the consumer 5 and any of the plurality of EV storage batteries parked is planned at any time. The storage battery groups B1 to B3 are controlled as one storage battery.

(Correction of Output Fluctuation of PV)

The upper graph of FIG. 10 indicates an operation example of the storage battery group 1 for correcting an output fluctuation of the PV. In the storage battery group B1, the storage battery ratio from 8:00 to 15:00 is 30% of the total storage battery capacity of the consumer 5 and the storage battery ratio from 8:00 to 15:00 is 20% of the total storage battery capacity of the consumer 5. The charging and discharging of the storage battery group B1 are controlled in the range of the allocated capacity C1 to correct the output fluctuation of the PV. In other words, from 8:00 to 15:00, 30% of all the storage batteries (total storage battery capacity) of the certain consumer 5 is allocated to the storage battery group B1 and used to correct the output fluctuation of the PV.

(Power Peak Cut)

The middle graph of FIG. 10 indicates an operation example of the storage battery group B2 for performing power peak cut on the consumer 5. In the storage battery group B2, the storage battery ratio from 8:00 to 15:00 is 40% of the total storage battery capacity of the consumer 5 and the storage battery ratio from 15:00 to 18:00 is 30% of the total storage battery capacity of the consumer 5. The storage battery group B2 is charged from 8:00 to 12:00 and is discharged for the power peak cut from 12:00 to 14:00. In addition, the storage battery group B2 is charged from 14:00 to 18:00.

(Provision of Adjustment Power)

The lower graph of FIG. 10 illustrates an operation example of the storage battery group 3 for providing adjustment power of the consumer 5 for power supply and demand adjustment of the power system 1. In the storage battery group B3, the storage battery ratio from 8:00 to 15:00 is 30% of the total storage battery capacity of the consumer and the storage battery ratio from 15:00 to 18:00 is 50% of the total storage battery capacity of the consumer. The storage battery group B3 receives an instruction from the aggregator 3 or the region energy management device 6 (CEMS) and is charged and discharged to provide adjustment power. The storage battery group B3 is charged from 8:00 to 10:00 and discharged to provide adjustment power from 11:00 to 14:00. In addition, the storage battery group B3 is charged from 14:00 to 16:00 and discharged to provide adjustment power from 17:00 to 18:00.

In addition, the present invention is not limited to the embodiments and may include other various applications and modifications without departing from the gist of the present invention described in the claims.

For example, the embodiments describe the configurations of the region energy management device 6 and the energy management devices 7 to 9 and 15 in detail and concretely in order to clearly explain the present invention and are not necessarily limited to all the components described above. In addition, it is also possible to add, remove, or replace other components for a part of the configuration of each embodiment.

In addition, some or all of the aforementioned configurations, functions, processing units, and the like may be implemented by hardware, for example, by designing using an integrated circuit. Furthermore, in the present specification, the process steps describing the time-series processing include the processes to be performed in the time-series order described and processes (for example, a parallel process or a process by an object) that may not be performed in time-series order and may be performed in parallel with or independently of each other.

LIST OF REFERENCE SIGNS

1 . . . Power System, 2 . . . Power transmission and distribution business operator, 3 . . . Aggregator, 4 . . . Business entity, 5 . . . Consumer, 6 . . . Region energy management device (CEMS), 7 . . . Building energy management device (BEMS), 8 . . . Factory energy management device (FEMS), 9 . . . Home energy management device (HEMS), 10 . . . Power supply equipment, 11 . . . Heat source equipment, 12 . . . Load equipment, 13 . . . Electric vehicle (EV), 14 . . . EV storage battery, 15 . . . EV energy management device (EV-EMS), 16 . . . Power, 17 . . . Exhaust Heat, 18 . . . Thermal energy (cold water, warm water, steam), 19 . . . Communication network, 30 . . . Computing device, 31 . . . CPU, B1 to B3 . . . Storage battery group, C1 to C3 . . . Allocated capacity, V1 to V3 . . . SOC

The invention claimed is:

1. A region energy management device that is disposed in a region including two or more consumers each including at least power supply equipment connected to a power system and a power load that receives power supply from the power supply equipment, and a charging/discharging device that charges and discharges a storage battery installed in a mobile body, the storage battery connected to the power supply equipment and operated as one type of the power supply equipment, and is connected directly or indirectly to energy management devices of each of the two or more consumers and an energy management device of the mobile body and able to communicate data with the energy management devices of each of the two or more consumers and the energy management device of the mobile body, wherein the region energy management device calculates an amount of power to be interchanged between the two or more consumers based on a storage battery remaining level distribution indicating a relationship between a position of each of a storage battery installed as the power supply equipment in each of the two or more consumers and the storage battery installed in the mobile body, that are present in the region at each time and a remaining level of the storage battery at each time, and excessive power and deficient power of each of the two or more consumers at each time and a target indicator of the region at each time in a case where each of the two or more consumers implements an operation plan for the power supply equipment to satisfy a target indicator of each of the two or more consumers.

2. The region energy management device according to claim 1, comprising:

a remaining level distribution prediction unit that predicts, as the storage battery remaining level distribution in the region, a consumer storage battery remaining level distribution indicating a relationship between a position of a storage battery of each of the two or more consumers at each time, a storage device being capable of receiving power supply from the power supply equipment, and a remaining level of the storage battery at each time, and a mobile body side storage battery remaining level distribution indicating a relationship between a position of the storage battery of the mobile body at each time and a remaining level of the storage battery at each time; and a region operation planning unit that calculates, based on the amount of power to be interchanged between the two or more consumers, power to be output by each of the two or more consumers at each time and power to be received by each of the two or more consumers at each time.

3. The region energy management device according to claim 2, wherein information indicating a relationship between a position of a storage battery installed as the power supply equipment in each of the two or more consumers at each time and a remaining level of the storage battery at each time, and information indicating a relationship between the storage battery of the mobile body at each time and a remaining level of the storage battery at each time are reflected in the consumer storage battery remaining level distribution.

4. The region energy management device according to claim 1, wherein the target indicator is energy cost, $CO_2$ emissions, or adjustment power to be provided.

5. The region energy management device according to claim 1, wherein the power to be interchanges is a power interchange between each of the two or more consumers performed by at least one of power interchange via a power transmission and distribution line of the power system connected to the two or more consumers and power interchange using the mobile body provided with the storage battery.

6. The region energy management device according to claim 1, wherein when adjustment power is to be procured by the region energy management device from each of the two or more consumers, the region energy management device determines a ratio of a storage battery capacity for adjustment power to a total storage battery capacity of a storage battery included in each of the two or more consumers based on an operation plan for the power supply equipment included in each of the two or more consumers at which the mobile body is present.

7. The region energy management device according to claim 1, wherein the mobile body provided with the storage battery is a vehicle that is able to move using power of the storage battery as a power source.

8. The region energy management device according to claim 1, wherein the energy management device of the mobile body charges and discharges the storage battery installed in the mobile body in accordance with an instruction from the region energy management device or the energy management devices of the two or more consumers.

9. The region energy management device according to claim 1, wherein a remaining storage battery level of the storage battery that is predicted based on a traveling plan and a charging/discharging plan for the storage battery installed in the mobile body is input to the region energy management device from the energy management device of the mobile body.

10. The region energy management device according to claim 1, wherein the deficient power or requested power at each time, a predicted value of a target indicator for power at each time, surplus power or power that can be provided at each time, and a predicted value of a target indicator for the power at each time are input to the region energy management device from each of the energy management devices of the two or more consumers.

11. A region energy management method by a region energy management device that is disposed in a region including two or more consumers each including at least power supply equipment connected to a power system and a power load that receives power supply from the power supply equipment, and a charging/discharging device that charges and discharges a storage battery installed in a mobile body, the storage battery connected to the power supply equipment and operated as one type of the power supply equipment, and is connected directly or indirectly to energy management devices of each of the two or more consumers and an energy management device of the mobile body and able to communicate data with the energy management devices of each of the two or more consumers and the energy management device of the mobile body, the method comprising causing the region energy management device to perform a process of calculating an amount of power to be interchanged between the two or more consumers based on a storage battery remaining level distribution indicating a relationship between a position of each of a storage battery installed as the power supply equipment in each of the two or more consumers and the storage battery installed in the mobile body, that are present in the region at each time and a remaining level of the storage battery at each time, and excessive power and deficient power of each of the two or more consumers at each time and a target indicator of the region at each time in a case where each of the two or more consumers implements an operation plan for the power supply equipment to satisfy a target indicator of each of the two or more consumers.

* * * * *